Dec. 1, 1964   P. E. FISCHER ETAL   3,158,903
MOLDING PRESS
Filed Nov. 1, 1961   4 Sheets-Sheet 3
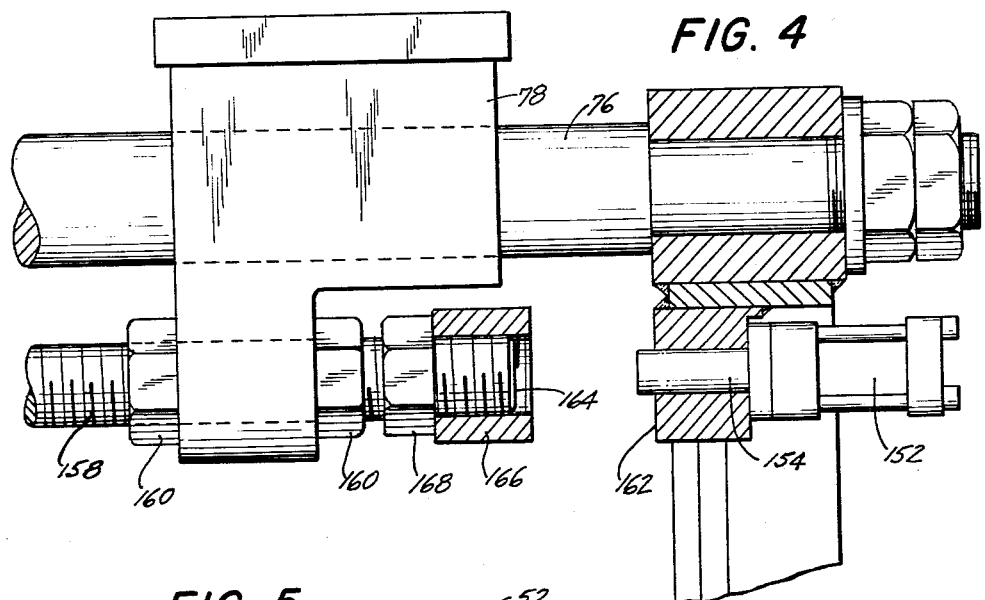
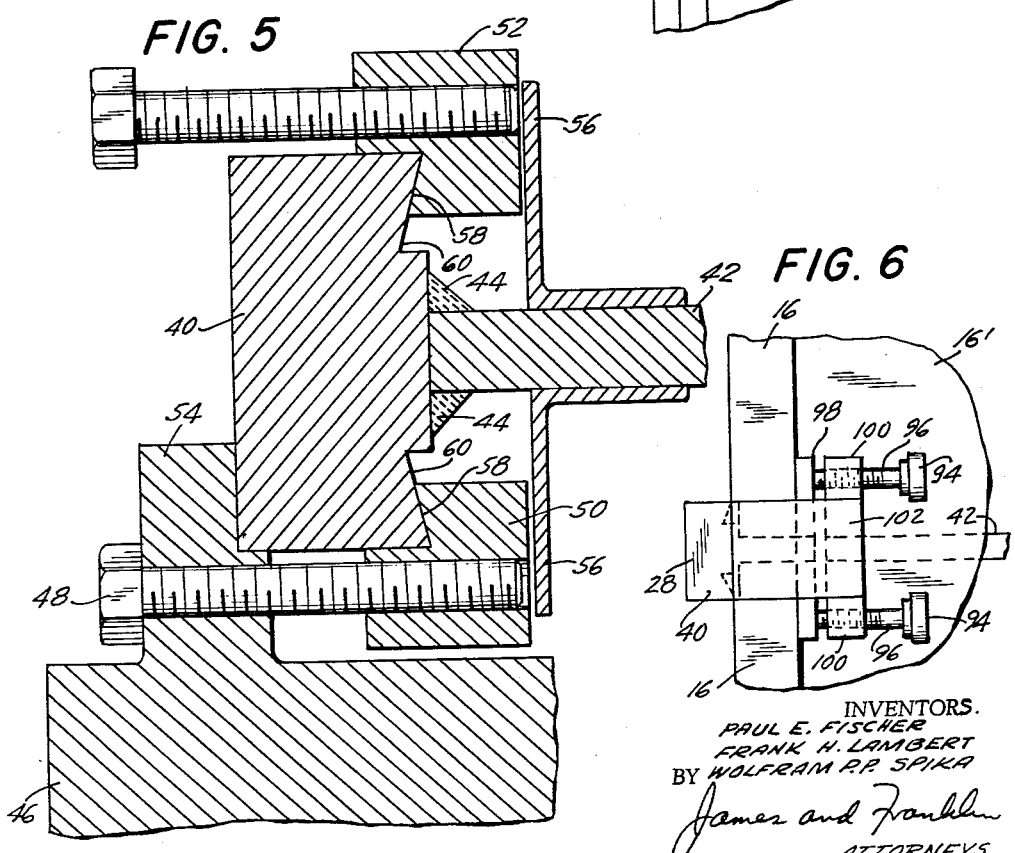
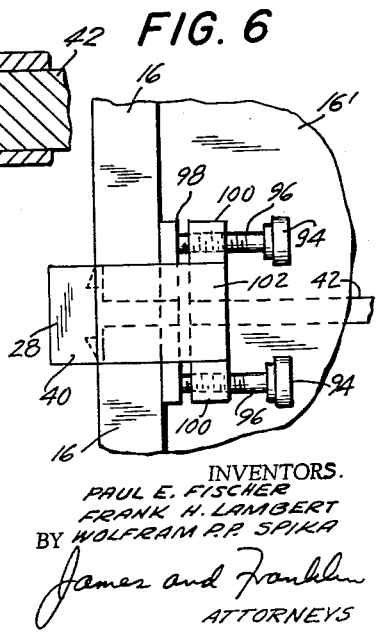
INVENTORS.
PAUL E. FISCHER
FRANK H. LAMBERT
BY WOLFRAM P.P. SPIKA
James and Franklin
ATTORNEYS Dec. 1, 1964     P. E. FISCHER ETAL     3,158,903
MOLDING PRESS
Filed Nov. 1, 1961     4 Sheets-Sheet 4
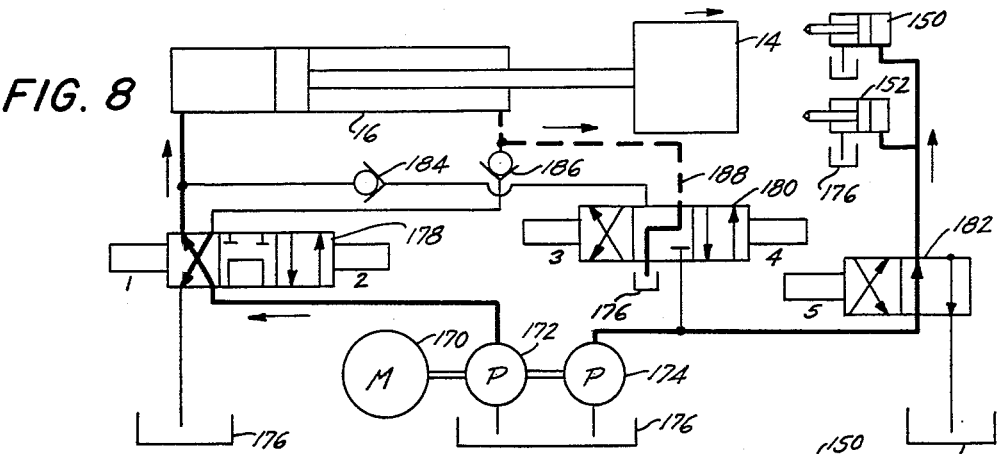
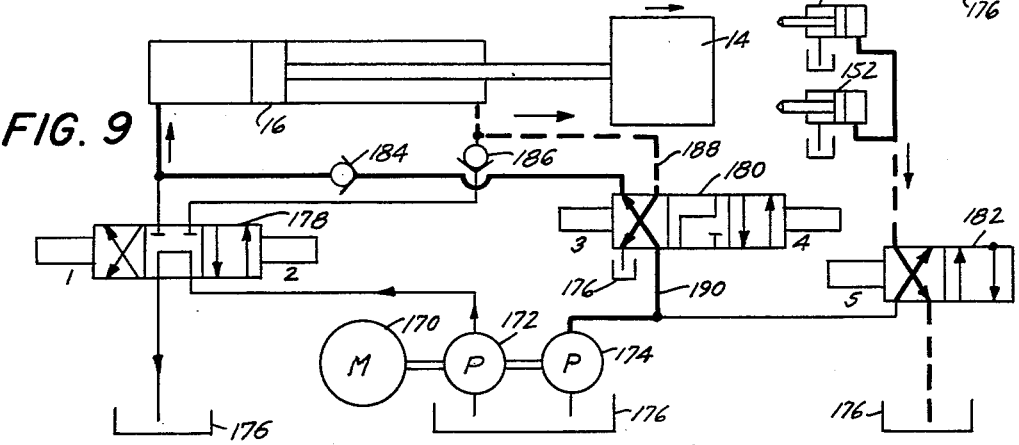
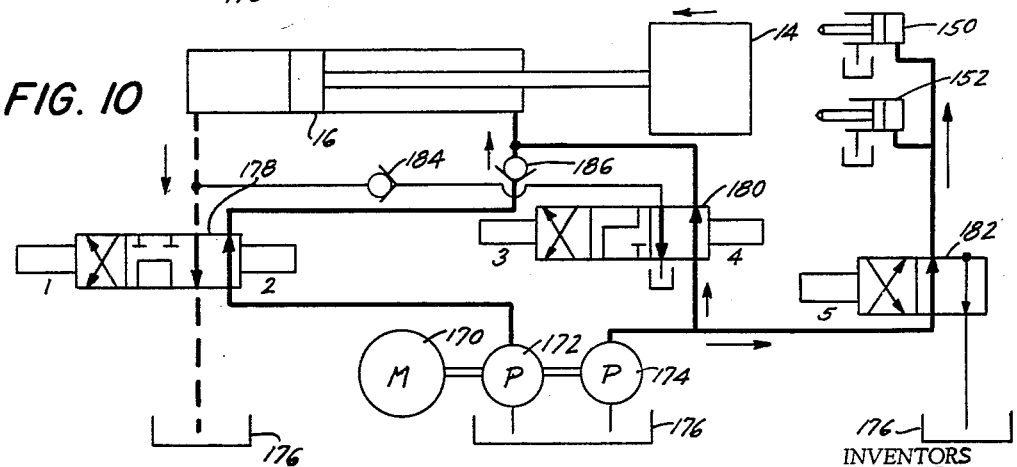
INVENTORS
PAUL E. FISCHER
FRANK H. LAMBERT
BY WOLFRAM P. P. SPIKA
James and Franklin
ATTORNEYS United States Patent Office 3,158,903
Patented Dec. 1, 1964

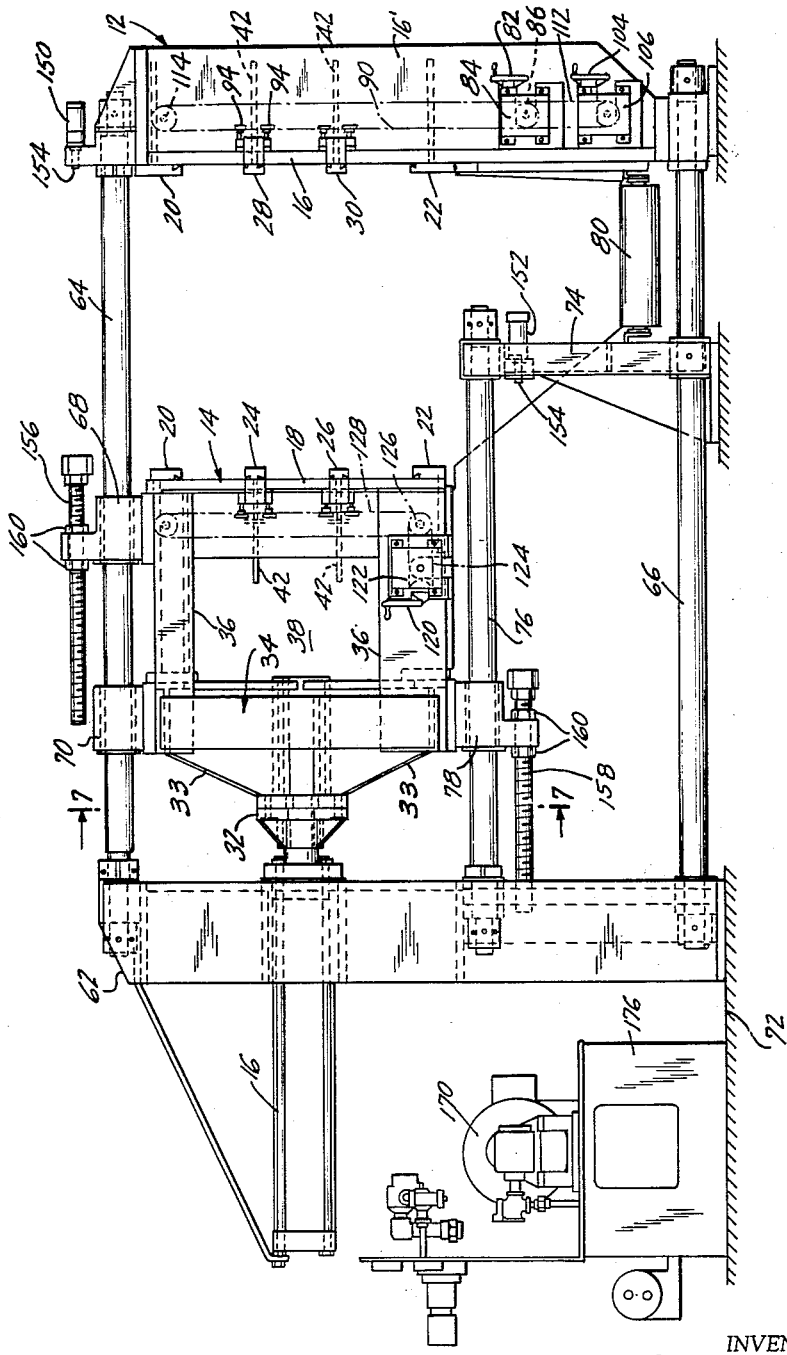
FIG. I
INVENTORS
PAUL E. FISCHER
FRANK H. LAMBERT
WOLFRAM P. P. SPIKA
BY
ATTORNEYS

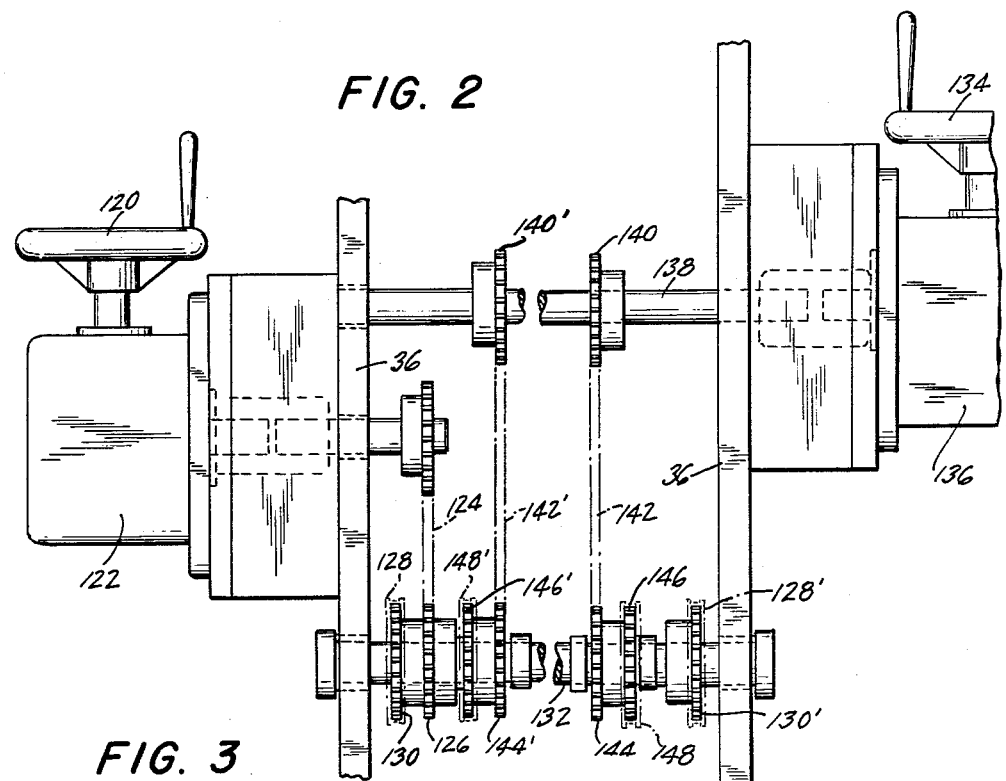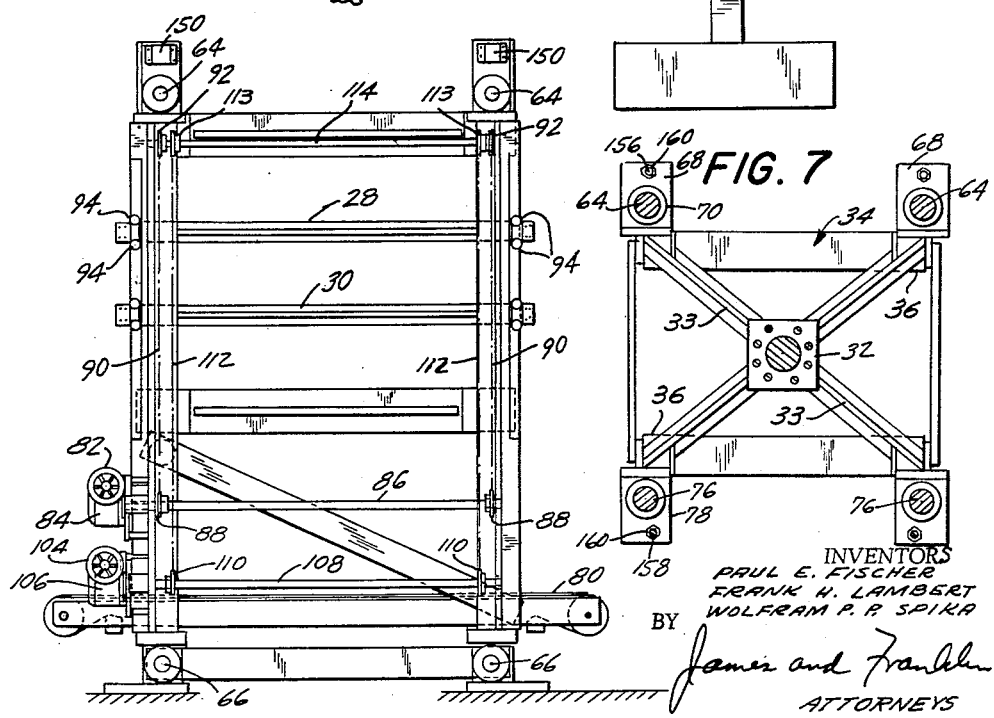

3,158,903
MOLDING PRESS
Paul E. Fischer, Cedar Grove, Frank H. Lambert, Pompton Lake, and Wolfram P. P. Spika, Lake Hiawatha, N.J., assignors to Champlain-Zapata Plastics Machinery, Inc., Caldwell, N.J., a corporation of Delaware
Filed Nov. 1, 1961, Ser. No. 149,437
12 Claims. (Cl. 18—17)

This invention relates to molding presses, particularly for the molding of expanded plastic beads.

The general object of the invention is to improve molding presses, and to provide a molding press particularly adapted for the molding of foam plastic articles out of expanded plastic beads.

One object of the present invention is to provide press platens which are in the form of a grid rather than a plate, and which have movable grid bars, so that the spacing therebetween may be changed to accommodate molds of different sizes. A further object is to facilitate mounting of the mold on the grid bars and to make the mounting operation a one-man operation. With this object in view, the grid bars are disposed horizontally, and are adjustable vertically on vertical ways, so that a mold may be rested on a grid bar as it is being attached by mounting bolts. A further object is to facilitate adjustment of the grid bars, and to insure equal movement at both ends, for which purpose each bar is connected to sprocket chains at the ends of the bar, and these are geared together for movement by crank operated reduction gearing. In addition the bars have clamp means to lock them in adjusted position.

Still another object is to make it possible to use any part of the platen, even in the case of the movable platen, and also to facilitate the connection of numerous service pipes to the mold. When molding expanded plastic beads this feature is important because it may be necessary to provide connections for dry air, lubricated air, low pressure steam, high pressure steam, and water. In accordance with the present invention, the plunger of the main operating cylinder is connected to a crosshead substantially coextensive with the movable platen, and the crosshead is connected to the platen by spacer struts, thus providing a substantial space behind the platen for easy connection of piping. Moreover, because the connection of the operating plunger is to the crosshead rather than the platen, even the center portion of the platen is open and available to receive a mold.

Still another object is to facilitate the actual attachment of the mold to the grid bars, and for this purpose the grid bars are provided with nuts which are slidable along the back of the grid bars at the edges thereof. These receive bolts which pass through the mold and outside the grid bar, so that each bolt may be located at any desired point along a grid bar. A still further object is to prevent loss of the nuts, for which purpose additional means is provided to retain the nuts against separation from the grid bar, without however interfering with the desired sliding action of the nuts.

Another object of the invention is to adapt the press to receive a conveyor disposed at a low level to gravitationally receive the molded articles. An ancillary object is to facilitate servicing of the press by making it possible to walk through the press. With these objects in view, the lower tie bars of the press are disposed substantially at floor level, and well below the movable platen.

To accomplish the foregoing general objects, and other more specific objects which will hereinafter appear, the invention resides in the molding press elements and their relation one to another as are hereinafter more particularly described in the following specification. The specification is accompanied by drawings in which:

FIG. 1 is a side elevation of a molding press embodying features of the invention;
FIG. 2 is a fragmentary plan view drawn to enlarged scale, and explanatory of the mechanism for adjusting the grid bars of the movable platen;
FIG. 3 is an end elevation looking toward the right end of the press shown in FIG. 1;
FIG. 4 is a partially sectioned enlarged view through one of the combined hydraulic and positive stops of the press;
FIG. 5 is a fragmentary vertical section explanatory of how a mold is secured to the grid bars;
FIG. 6 is explanatory of a detail;
FIG. 7 is a view taken on the line 7—7 of FIG. 1 and shows the crosshead;
FIG. 8 is a hydraulic diagram showing the flow during closing of the press to the cracked open position;
FIG. 9 is a similar diagram showing the flow during clamping or complete closing of the mold; and
FIG. 10 is a similar diagram showing the flow during opening of the press.

Referring to the drawing, and more particularly to FIG. 1, the molding press comprises a stationary platen 12, which is of the open frame or grid type rather than a plate, and which, for convenience, may be referred to as a frame platen. There is also a movable frame platen 14, and a main hydraulic cylinder 16 to move the platen 14 toward or away from the platen 12. The platens comprise vertical ways 17 and 18 at their side edges, with horizontal grid bars extending between the ways. The top grid bars 20 and the bottom grid bars 22 are fixed to the ways, but the intermediate grid bars 24, 26, 28 and 30 are adjustably movable up and down on the ways, as by means of crank and sprocket chain mechanism.

Again referring to FIG. 1, the plunger of cylinder 16 is connected to a crosshead 32 which is enlarged at 34 so that it is substantially coextensive with the platen 14. The crosshead has four radial parts disposed diagonally as shown at 33 in FIG. 7. Rigid struts 36 extend between the corners of the crosshead 34 and the corners of the platen 14. Thus a substantial open space 38 is provided behind the platen 14, and this makes the entire area of the platen usable, in addition to facilitating the connection of numerous service pipes to the mold. The movable parts may be called a platen assembly.

Referring now to FIG. 5, each grid bar comprises a forward portion 40 backed up by a wide stiffening portion 42, only a part of which is shown in FIG. 5, the deep dimension of which will be evident from inspection of FIG. 1. These parts may be welded together as shown at 44. The mold, a fragment of which is indicated at 46, is received between two grid bars and is secured thereto by bolts, one of which is indicated at 48. Bolt 48 is received in a nut 50 which is slidable along the back of the grid bar 40 at its bottom edge. A similar nut 52 may be provided for use along the upper edge of the grid bar. The bolt 48 passes through a flange 54 of mold 46, and then outside the grid bar and into the nut 50. With this arrangement each bolt may be located at any desired point along the grid bar.

In preferred form additional means may be provided to retain the nuts against separation from the grid bar. In the present case backing plates 56 are disposed behind the nuts, and the latter are given a sloping configuration at 58 to correspond to a mating slope 60 at the back of the grid bar. With this arrangement there is no interference with the desired sliding action of the nuts 50 and 52, and yet they remain in conveniently available position for use by an operator who may be mounting a mold in the machine. This is in lieu of the provision of drilled or tapped holes in the grid bars which would necessarily have to be at spaced increments or distance.

Those familiar with this work will also recognize the convenience arising from the use of horizontal grid bars arranged so that the body of a mold may be slid therebetween. With this arrangement the mold is fairly well supported while the mounting bolts are being applied, and the operation may be performed by one man.

Although nuts 50 and 52 are shown at the top and bottom of the grid bar in FIG. 5, it will be understood, on reverting to FIG. 1, that the top fixed grid bars 20 have nuts along only the bottom edge, while the bottom fixed grid bars 22 have nuts only along their top edge. There are also a plurality of movable grid bars, in this case two movable grid bars for each platen, and these have nuts along both the top and bottom edge of each grid bar. These nuts have been omitted in FIG. 1 because of the small scale of the drawing.

The complete press includes the usual stationary header or main cylinder frame 62 which carries the main cylinder 16. Upper tie rods 64 and lower tie rods 66 extend between the frame 62 and the stationary platen 12. The upper portion of the movable frame assembly is slidably mounted on the upper tie rods 64, as is indicated at 68 and 70. The lower tie rods 66 are substantially at the floor level 72, and well below the movable platen 14. In the particular press here shown there is also a stationary plate 74 which is disposed at a lower level than the movable platen 14 and between the frame 62 and the stationary platen 12. Intermediate tie rods 76 of reduced length extend between the frame 62 and the plate 74. The movable platen assembly, or more specifically in the present case, its rear part or crosshead 34, is slidably mounted on the intermediate tie rods 76, as shown at 78.

The dropping of the lower tie rods 66 to floor level has several important advantages. One is that a conveyor 80 for removing the molded articles may be located between the platens and below the movable platen. The conveyor may receive the molded articles by gravity discharge from the mold when the mold is open.

Another advantage of the dropped lower rods 66 is that servicing of the press is facilitated by the possibility of walking through the press between the platens.

It was previously mentioned that the vertical adjustment of the horizontal grid bars is facilitated by appropriate crank and sprocket chain mechanism. Referring to FIGS. 1 and 3, the upper crank wheel 82 drives worm reduction gearing housed in a gear box 84 and terminating in a shaft 86. This carries sprocket wheels 88 which drive sprocket chains 90. The latter are carried at their upper ends on sprocket wheels 92. The upper grid bar 28 is connected to the forward pass of the sprocket chains 90, and rotation of crank 82 raises or lowers the grid bar 28. It remains temporarily in adjusted position because of the use of worm gearing, which is not reversible.

When the grid bar has been moved to desired position it is clamped in that position by tightening two clamp knobs 94 at each end of the grid bar. These are drawn to somewhat larger scale in FIG. 6, in which each knob 94 turns a screw 96 bearing against a shoe 98 riding on the rear of the upright way 16. The forward element 40 of grid bar 28 rides in front of the ways 16, while the stiffening web 42 is somewhat shorter and is located between the upright ways 16 and their stiffening webs (shown at 16' in FIG. 1). The screws 96 pass through parts 100 carried by a rearwardly projecting block 102 secured at each end of each grid bar. It will thus be evident that when the screws 96 are tightened the shoe 98 is forced against the way 16, simultaneously pulling the grid bar 40 in opposite direction against the way, and thus locking the grid bar in position.

Reverting to FIGS. 1 and 3, it will be understood, without going into similar detail, that the crank wheel 104 drives worm reduction gearing in gear box 106 to turn a lower shaft 108 which carries sprocket wheels 110 for another pair of sprocket chains 112 which are supported at their upper ends on a pair of idle sprocket gears 113 which rotate freely on the same shaft 114 that carries the sprocket gears 92. The chains 112 are connected to the lower grid bar 30, much as the chains 90 are connected to the upper grid bar 28. Also the lower grid bar similarly has two clamp knobs at each end to lock the grid bar in adjusted position, the mechanism being similar to that shown in FIG. 6.

The adjustment of the movable grid bars 24 and 26 of the movable platen 14 is also facilitated by the provision of sprocket chains, but in this case the mechanism must travel with the platen, and for lack of room it is more convenient to locate one crank on each side of the platen. In FIG. 1 the crank wheel 120 turns worm reduction gearing in a gear box 122 which drives a horizontal sprocket chain 124 and a sprocket gear 126 which drives a vertical sprocket chain 128. Similar mechanism is provided on the other side, and the arrangement may be described in greater detail with reference to FIG. 2, which is a fragmentary plan view, with most of the middle region eliminated so that the side parts may be drawn to enlarged scale.

As previously explained, crank wheel 120 turns reduction gearing in box 122 which drives a horizontal sprocket chain 124. This drives a sprocket gear 126 which is formed integrally with or secured to a sprocket gear 130 which drives a vertical chain suggested in broken lines at 128. The gears 126 and 130 are fast on a shaft 132 which extends to the opposite side of the machine, and which there carries a companion sprocket gear 130' for driving a companion upright chain 128'. These chains may carry either grid bar, and in the present case carry the upper grid bar.

At the other side of the machine a crank wheel 134 drives worm reduction gearing housed in a gear box 136 which turns a shaft 138 which extends across the machine to the opposite side. At one side it carries a sprocket gear 140, and at the opposite side a companion sprocket gear 140'. These drive horizontal chains 142 and 142' which turn sprocket gears 144 and 144'. The latter are integral with or secured to sprocket gears 146 and 146' located at opposite sides of the platen, and which carry upright chains suggested in broken lines at 148 and 148'. These carry the other grid bar, in this case the lower grid bar. It will be understood that the gears 144, 146, 144' and 146' all turn freely on the cross shaft 132.

It will also be understood that the grid bars 24 and 26 are provided with two clamping or lock knobs at each end, much as described previously for the grid bars 28 and 30, and as shown in FIG. 6.

In foam molding the mold is to be cracked open during the first part of the molding cycle, and to save time, it here is preferably incompletely closed in the first place. For this purpose the stationary platen 12 is provided with hydraulic stops 150. There are preferably four such stops acting effectively in the corners of the platen, and if desired, the two lower stops may be mounted on platen 12, but in the present case it is found somewhat more convenient to mount the two lower stops 152 on the plate 74, as shown in FIG. 1. The hydraulic stops include cylinders which may be single acting, and plungers 154 which are directed toward the movable platen. The movable platen assembly carries stop members 156 and 158, which are preferably in the form of adjustable stop screws. The adjustment of the screws is locked by means of appropriate nuts 160, and the adjustment is made such that all four stops come into effect simultaneously and arrest continued movement of the movable platen when the mold is cracked open by a desired amount. This may range from 0.005 to 0.040 inch, but the illustrated structure makes possible a range of from 0.001 to 0.375 inch. At this time the force from the main cylinder 16 is kept below that of the hydraulic stops, and in the particular case here shown the main cylinder may be operated by either low pressure fluid or high pressure fluid. It is initially operated by low pressure fluid, at which time it does not overcome the hydraulic stops. Later when operated by high pressure fluid it readily overcomes the hydraulic stops, but in any case, the latter at that time are preferably released and offer no resistance to the main cyilnder.

Because the die cavity may be large to form a large foamed plastic article, and because the die construction may itself be relatively light, it is desirable to provide positive stops which guard against possible injury to the mold, for the mold closing force may have to be quite high during the molding operation itself because of the counteracting force of expansion of the plastic material. In the present case the positive stops are intimately associated with the hydraulic stops, and referring to FIG. 4, which shows one of the lower stops drawn to larger scale, the stationary press has positive stop surfaces 162 surrounding the plungers 154 of the hydraulic stops 150. The stop screw 158 has its effective stop surface at 164. It additionally carries a positive stop nut 166, the position of which is adjustable, and the adjustment of which may be locked by means of a lock nut 168. It will be evident that when the hydraulic stop plunger 154 is projected, it acts on the stop screw surface 164 before the positive stop nut 166 reaches the positive stop surface 162. In fact the distance between the latter represents the amount by which the mold is cracked open. However, when the hydraulic stops are made ineffective, the additional travel is limited by the engagement of positive stop nut 166 with positive stop surface 162, and this adjustment is made such that the mold is effectively and tightly closed, but without possibility of injuring the mold.

The hydraulic operation may be described with reference to FIGS. 8, 9 and 10 of the drawing. Referring to FIG. 8, a motor 170 drives both a low pressure pump 172 and a high pressure pump 174. There is a common sump or tank indicated at 176. The main cylinder is shown at 16 for moving the movable platen 14, while the hydraulic stops are shown at 150 and 152. The system is controlled by three valves, indicated at 178, 180 and 182. In practise these are solenoid operated, and the solenoids are marked 1 through 5 respectively. Check valves may be provided at 184 and 186.

FIG. 8 shows the closing of the press, and it will be seen that the low pressure fluid from pump 172 flows through valve 178 to the outer end of the main cylinder, thereby moving the platen 14 to the right. Oil from the inner end of the main cylinder flows through the valve 180 to the tank 176, as shown by the broken line 188. Pressure fluid from the high pressure pump 174 flows through valve 182 to the hydraulic stops. The press is rapidly and economically closed by the large volume low pressure fluid. In the particular case here shown, the main cylinder at this time exerts a force of eight tons, and the hydraulic stops exert a force of three tons each, or twelve tons in all.

After the filling and preliminary steaming of the mold cavity, it may be completely closed by appropriate operation of the valves, as shown in FIG. 9 of the drawing. At this time the hydraulic stops are released as shown by the discharge of fluid through the valve 182 to tank 176. The main cylinder is now fed with high pressure fluid from pump 174, this fluid flowing through line 190, valve 180, and check valve 184 to the main cylinder. Return flow through line 188 is maintained and leads to tank 176. The low pressure pump 172 is idle and its liquid circulates back to the tank 176 through valve 178.

When supplied with high pressure fluid, the main cylinder in the illustrated press develops a force of fifty tons. This is needed because of the large area of the press platen, which is three feet high by four feet wide, and which may accept a correspondingly large mold having a large cavity area at the parting face. Under maximum area conditions the fifty ton force is needed, and yet because of the size and complexity of the molds used for foam molding, which preferably have thin walls because they must be repeatedly heated and cooled in successive molding cycles, the mold may be injured by the fifty ton closing force when there is no counter-force in the mold cavity itself. It is for that reason that the positive stops are desirable.

The opening of the press is shown in FIG. 10. It usually requires extra great force to initially break the mold open. Accordingly, high pressure fluid is fed from pump 174 through valve 180 to the inner end of the main cylinder 16. The action is aided by the hydraulic stops, and for this purpose high pressure fluid is fed to them through valve 182. In addition, low pressure fluid is fed from pump 172 through valve 178 to the inner end of the main cylinder 16. This causes rapid and more economical opening of the press. The fluid from the outer end of cylinder 16 is discharged through valve 178 to tank 176.

With the particular solenoid operated valves here shown, solenoid 1 is energized during closing of the mold. Solenoid 1 is de-energized and solenoids 3 and 5 are energized during the clamping of the mold for the molding operation. These solenoids are de-energized and solenoid 4 is energized during opening of the mold.

The hydraulic arrangement of the press may include refinements to accelerate and decelerate the press motion near the ends of the travel of the movable platen. Limit switches and interlocking switches and a timing clock may be employed for any desired degree of automatic operation of the press, but for purposes of the present invention, it may be assumed that the switches are manually operated to control the solenoid valves.

Reverting to FIG. 1 the tank 176 and the motor 170 with its high and low pressure pumps may be mounted on the tank and beneath the main cylinder 16, as shown.

It is believed that the construction and operation and method of use of the improved molding press, as well as the advantages thereof, will be apparent from the foregoing detailed description. It will also be apparent that while the improved press has been shown and described in a preferred form, changes may be made in the structure shown, without departing from the scope of the invention as sought to be defined in the following claims.

We claim:

1. A molding press for use in the molding of foam plastic articles of expanded plastic beads, said press comprising
    (a) a stationary upright frame platen adapted to receive at least one first mold section thereon,
    (b) a movable upright platen assembly mounted for movement toward and away from said stationary platen and including a movable frame platen adapted to receive at least one second mold section thereon for mating relation with the first mold section,
    (c) hydraulically operable means operatively connected to said movable platen assembly for moving the same toward and away from said stationary platen,
    (d) each of said platens comprising
        (1) a plurality of spaced apart vertical ways,
        (2) a pair of top and bottom horizontal bars fixed to said ways, and
        (3) at least one intermediate horizontal bar mounted on said ways for movement along said vertical ways for vertical adjustment relative to said top and bottom horizontal bars for accommodating mold sections of varying size, and
    (e) means operatively connected to each of said intermediate horizontal bars for vertically moving and adjusting opposite ends thereof simultaneously and in equal amounts for maintaining said intermediate bars horizontal during vertical adjustment thereof.

2. A molding press according to claim 1 wherein each of said platens includes a plurality of vertically adjustable intermediate horizontal bars, and including
    (f) clamping means operatively associated with opposite ends of each of said intermediate bars for clamping the same in any adjusted position on said vertical ways.

3. A molding press according to claim 1 wherein said movable platen assembly (b) includes a crosshead connected to said hydraulically operable means and being spaced from said movable platen on the opposite side thereof from said stationary platen and being connected to said movable platen only at a plurality of spaced apart points to provide substantially free access to the rear of said movable platen for the connection of service pipes therethrough to a mold section mounted on said movable platen.

4. A molding press according to claim 1 including
   (f) means facilitating the mounting of mold sections on said platens comprising nuts mounted on the back of said horizontal bars at an edge thereof for slidable movement therealong to any desired adjusted position for receipt of bolts passing through the mold sections and outside the grid bars to mount the mold sections on the platens in any desired position.

5. A molding press for use in the molding of foam plastic articles of expanded plastic beads, said press comprising
   (a) a stationary upright frame platen adapted to receive at least one first mold section thereon,
   (b) a movable upright platen assembly mounted for movement toward and away from said stationary platen and including
      (1) a movable frame platen adapted to receive at least one second mold section thereon for mating relation with the first mold section, and
      (2) a crosshead spaced rearwardly of said movable platen relative to said stationary platen and being connected thereto only at a plurality of spaced apart points to provide substantially free access to the rear of said movable platen for the connection of service pipes therethrough to a mold section mounted thereon,
   (c) hydraulically operable means operatively connected to said crosshead for moving said movable platen toward and away from said stationary platen,
   (d) each of said platens comprising
      (1) a plurality of spaced apart vertical ways,
      (2) a pair of top and bottom horizontal bars fixed to said ways, and
      (3) a plurality of spaced apart intermediate horizontal bars mounted on said vertical ways for movement therealong for vertical adjustment relative to said top and bottom horizontal bars for accommodating mold sections of varying size and number,
   (e) means operatively connected to each of said intermediate horizontal bars for vertically moving and adjusting opposite ends thereof simultaneously and in equal amounts for maintaining said intermediate bars horizontal during vertical adjustment thereof, and
   (f) clamping means operatively associated with opposite ends of each of said intermediate bars for clamping the same in any adjusted position on said vertical ways.

6. A molding press according to claim 5 including
   (g) means facilitating the mounting of mold sections on said platens comprising
      (1) a plurality of nuts mounted on the back of each of said horizontal bars and extending outwardly from at least one edge thereof for slidable movement therealong to any desired adjusted position for receipt of bolts passing through the mold sections and outside the grid bars to mount the mold sections on the platens in any desired position, and
      (2) means operatively associated with each of said nuts for releasably retaining the nuts on said grid bars without interfering with the sliding movement of the nuts along said horizontal bars.

7. A molding press for use in the molding of foam plastic articles of expanded plastic beads, said press comprising
   (a) a stationary upright frame platen adapted to receive at least one first mold section thereon,
   (b) a movable upright platen assembly mounted for movement toward and away from said stationary platen and including
      (1) a movable rectangular frame platen adapted to receive at least one second mold section thereon for mating relation with the first mold section, and
      (2) a rectangular crosshead spaced rearwardly of said movable platen relative to said stationary platen and being connected to said movable platen only at the four corners thereof to provide free access to substantially all of the rear of said movable platen for the connection of service pipes therethrough to a mold section mounted thereon,
   (c) hydraulically operable means operatively connected to said crosshead for moving said movable platen toward and away from said stationary platen,
   (d) each of said platens comprising
      (1) a pair of spaced apart vertical ways at opposite sides of each platen,
      (2) a pair of top and bottom horizontal bars fixed to opposite ends of said vertical ways at the top and bottom of each platen, and
      (3) a plurality of spaced apart intermediate horizontal bars mounted on said vertical ways for movement therealong for vertical adjustment of said intermediate bars relative to said top and bottom horizontal bars for accommodating mold sections of varying size and number,
   (e) means operatively connected to each of said horizontal bars for vertically moving and adjusting opposite ends thereof simultaneously and in equal amounts for maintaining said intermediate bars horizontal during vertical adjustment thereof, each of said intermediate bar adjusting means comprising
      (1) a pair of sprocket chains for the corresponding intermediate bar and being connected to opposite ends thereof,
      (2) sprockets mounting said sprocket chains for rotation in a vertical plane,
      (3) reduction gearing operatively connected to at least one of said sprockets for each sprocket chain for rotating the same, and
      (4) crank means operatively connected to said reduction gearing for operating the same,
   (f) clamping means operatively associated with opposite ends of each of said intermediate bars for clamping the same in any adjusted position on said vertical ways, and
   (g) means facilitating the mounting of mold sections on said platens comprising nuts mounted on the rear of each of said horizontal bars for slidable movement therealong to any deisred position, said nuts on the top horizontal bars of each of said platens extending downwardly below the lower edge thereof, said nuts on the bottom horizontal bar of each of said platens extending upwardly above the upper edge thereof, and said nuts on each of said intermediate bars extending upwardly and downwardly above and below opposite side edges thereof, said nuts being adapted to receive bolts passing through mold sections and outside said grid bars to mount the mold sections on the platens in any desired position.

8. A molding press for use in the molding of foam plastic articles of expanded plastic beads, said press comprising
   (a) a stationary frame including
      (1) a first upright frame section,
      (2) a second upright frame section spaced from said first upright frame section, (3) a pair of laterally spaced horizontal upper tie members connecting said upright frame sections at the upper portions thereof,
(4) a pair of laterally spaced horizontal lower tie members connecting said spaced apart upright frame sections at the lower portions thereof,
(5) a pair of laterally spaced horizontal intermediate tie members disposed between and in spaced relation to said upper and lower tie members and being connected at one end thereof to said second upright frame section and extending toward but terminating at the other ends thereof in spaced relation to said first frame section, and
(6) an upright intermediate frame member supporting said other ends of said intermediate tie members and being spaced from said first frame section and said lower tie members, the area between said intermediate frame member and said first frame section being unobstructed for free access thereto,
(b) a stationary upright platen mounted on said first upright frame section and being adapted to receive at least one first mold section thereon,
(c) a movable upright platen assembly mounted on said upper and intermediate tie members for movement toward and away from said stationary platen and including a movable platen adapted to receive at least one second mold section thereon for mating relation with the first mold section, and
(d) hydraulically operable means mounted on said second upright frame section and operatively connected to said movable platen assembly for moving the same toward and away from said stationary platen.

9. A molding press according to claim 8 wherein said movable platen assembly includes
(1) a movable frame platen comprising spaced apart vertical ways and a plurality of horizontal bars mounted on said ways, at least some of said horizontal bars being mounted for vertical adjustment relative thereto, and
(2) a crosshead connected to said hydraulically operable means and spaced rearwardly of said movable platen relative to said stationary platen and being connected to said movable platen only at a plurality of spaced apart points to provide substantially free access to the rear of said movable platen for the connection of service pipes therethrough to a mold section mounted on said movable platen.

10. A molding press according to claim 9 wherein said movable platen and said crosshead are slidably suspended from said upper tie members, and wherein said crosshead is slidably mounted on said intermediate tie members, the movable platen being free of said intermediate tie members.

11. A molding press according to claim 10 including
(e) first hydraulic stop means carried by the upper portion of said first frame section and second hydraulic stop means carried by the upper portion of said intermediate frame member, and
(f) first adjustable stop means carried by the upper portion of said movable platen for cooperation with said first hydraulic stop means and second adjustable stop means carried by the lower portion of said crosshead for cooperation with said second hydraulic stop means, said hydraulic and adjustable stop means cooperating to initially stop said movable platen upon movement thereof toward said stationary platen in a position corresponding to cracked open position of a mold and to finally stop said movable platen in a position corresponding to closed position of a mold.

12. A molding press for use in the molding of foam plastic articles of expanded plastic beads, said press comprising
(a) a stationary frame including
(1) a first upright frame section,
(2) a second upright frame section spaced from said first upright frame section,
(3) a pair of laterally spaced horizontal upper tie members connecting said upright frame sections at the upper portions thereof,
(4) a pair of laterally spaced horizontal lower tie members connecting said spaced apart upright frame sections at the lower portions thereof,
(5) a pair of laterally spaced horizontal intermediate tie members disposed between and in spaced relation to said upper and lower tie members and being connected at one end thereof to said second upright frame section and extending toward but terminating at the other ends thereof in spaced relation to said first frame section, and
(6) an upright intermediate frame member supporting said other ends of said intermediate tie members and being spaced from said first frame section and said lower tie members, the area between said intermediate frame member and said first frame section being unobstructed for free access thereto,
(b) a stationary upright frame platen mounted on said first upright frame section and adapted to receive at least one first mold section thereon,
(c) a movable upright platen assembly comprising a movable frame platen adapted to receive at least one second mold section thereon, and a crosshead spaced rearwardly from said movable frame platen relative to said stationary platen and being connected to said movable frame platen only at a plurality of spaced apart points to provide substantially free access to the rear of said movable platen for the connection of service pipes therethrough to a mold section mounted on said movable platen, said movable platen and said crosshead being slidably suspended from said upper tie members and said crosshead being slidably mounted on said intermediate tie members with said movable platen being free of said intermediate tie members,
(d) each of said platens comprising
(1) a plurality of spaced apart vertical ways,
(2) a pair of top and bottom horizontal bars fixed to said ways, and
(3) a plurality of intermediate horizontal bars mounted on said vertical ways for movement therealong for vertical adjustment of said intermediate bars relative to said top and bottom horizontal bars for accommodating mold sections of varying size and number thereon,
(e) means operatively connected to each of said intermediate horizontal bars for vertically moving and adjusting opposite ends thereof simultaneously and in equal amounts for maintaining said intermediate bars horizontal during vertical adjustment thereof,
(f) hydraulically operable means carried by said second upright frame section and being operatively connected to said crosshead for moving said movable platen assembly toward and away from said stationary platen, and
(g) driven conveyor means disposed between said first upright frame section and said intermediate frame member below said stationary and movable patens.

References Cited in the file of this patent

UNITED STATES PATENTS 340,555     Cardona _____ Apr. 27, 1886
2,351,529   Luxenberger et al. _____ June 13, 1944

(Other references on following page)

UNITED STATES PATENTS

| | | |
|---|---|---|
| 2,372,833 | Jobst | Apr. 3, 1945 |
| 2,492,502 | Salmon | Dec. 27, 1949 |
| 2,564,884 | De Sternberg | Aug. 21, 1951 |
| 2,585,297 | Beuscher | Feb. 12, 1952 |
| 2,642,621 | Amo | June 23, 1953 |
| 2,699,573 | Roach | Jan. 18, 1955 |
| 2,718,662 | Bohannon et al. | Sept. 27, 1955 |
| 2,755,505 | Bishop | July 24, 1956 |
| 2,850,766 | Press et al. | Sept. 9, 1958 |
| 2,912,717 | Yarrison et al. | Nov. 17, 1959 |
| 2,929,104 | Hutton | Mar. 22, 1960 |
| 2,938,232 | Martin | May 31, 1960 |
| 3,044,119 | Poulin | July 17, 1962 |

FOREIGN PATENTS

| | | |
|---|---|---|
| 497,136 | Canada | Oct. 27, 1953 |